UNITED STATES PATENT OFFICE.

THOMAS ARNOLD, OF DES MOINES, IOWA.

HOG-CHOLERA COMPOUND.

SPECIFICATION forming part of Letters Patent No. 223,429, dated January 13, 1880.

Application filed November 14, 1879.

*To all whom it may concern:*

Be it known that I, THOMAS ARNOLD, of Des Moines, in the county of Polk and State of Iowa, have invented certain new and useful Improvements in Hog-Cholera Compounds; and I do hereby declare that the following is a full, clear, and exact description of the invention, which will enable others skilled in the art to which it appertains to make and use the same.

In the preparation of my medicine I take five pounds of Glauber's salt, one pound of Epsom salts, one-half pound of capsicum, one pint of spirits of turpentine, one pound of rosin, one-half pound of bicarbonate of soda, one ounce prussic acid, one-half pound of balsam of copaiba, one pound of Spanish brown, and two gallons of water. I then place these ingredients in a tub or other suitable receptacle and stir them until they are thoroughly compounded.

My method of treatment is as follows: First, I separate the sick hogs from those not diseased, the sick swine being placed in a clean pen on high ground, where they will be kept dry, and during the next twenty-four hours thereafter I neither feed them nor give them water; and for four or five days immediately subsequent thereto I burn old corn on the cob in the lot with the hogs until the same is charred on the outside, and allow the hogs to eat all they desire. After the hogs have been deprived of food and water for twenty-four hours, I then feed to each hog every day for the period of four or five days thereafter, or until the hog is physicked, from one gill to two gills of the cure mixed in a little sweet milk—say from a pint to a quart. The sick hogs should be exercised two or three times a day by driving them around the pen, and after a treatment of four or five days they should be given burnt corn at least once a week.

If the hogs will not eat the medical compound as desired, it must be fed to them by drenching—that is, by pouring it down the throat from a horn or long-necked bottle—while the hog is held on his haunches. This can readily be accomplished by placing a stick in the hog's mouth crosswise, and emptying the medicine down the throat and below the stick; but this method of treatment is very seldom necessary.

In administering the medicine to healthy swine as a preventive, they should first be given three doses thereof, as above indicated, using the burnt corn as directed, and thereafter one-half pint of the medicine should be fed to each hog in milk or slops once or twice a week.

I claim—

The medical compound herein described, consisting of Glauber's salt, Epsom salts, capsicum, spirits of turpentine, rosin, bicarbonate of soda, prussic acid, balsam of copaiba, Spanish brown, and water, in the proportions specified, substantially as and for the purpose described.

In testimony that I claim the foregoing as my own I affix my signature in presence of two witnesses.

THOS. ARNOLD.

Witnesses:
ABRAM H. COLE,
JACOB A. COLE.